US012643551B2

(12) United States Patent
Abe et al.

(10) Patent No.: US 12,643,551 B2
(45) Date of Patent: Jun. 2, 2026

(54) CONTROL DEVICE FOR VEHICLE

(71) Applicant: MITSUBISHI JIDOSHA KOGYO KABUSHIKI KAISHA, Tokyo (JP)

(72) Inventors: Hiroo Abe, Tokyo (JP); Ryo Hachisuka, Tokyo (JP); Shunsuke Matsuo, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/849,839

(22) PCT Filed: Apr. 21, 2023

(86) PCT No.: PCT/JP2023/015964
§ 371 (c)(1),
(2) Date: Sep. 23, 2024

(87) PCT Pub. No.: WO2023/210534
PCT Pub. Date: Nov. 2, 2023

(65) Prior Publication Data
US 2025/0222933 A1      Jul. 10, 2025

(30) Foreign Application Priority Data
Apr. 28, 2022      (JP) ................................. 2022-074224

(51) Int. Cl.
*B60W 40/064*      (2012.01)
*B60W 10/04*      (2006.01)
(Continued)

(52) U.S. Cl.
CPC .......... *B60W 40/064* (2013.01); *B60W 10/04* (2013.01); *B60W 10/18* (2013.01);
(Continued)

(58) Field of Classification Search
CPC .... B60W 40/064; B60W 10/04; B60W 10/18; B60W 10/20; B60W 10/22; B60W 30/02;
(Continued)

(56) References Cited

U.S. PATENT DOCUMENTS

2019/0047616 A1* 2/2019 Lesbirel ............... B62D 15/029

FOREIGN PATENT DOCUMENTS

JP            2010-202046 A      9/2010

OTHER PUBLICATIONS

International Preliminary Report on Patentability and English translation of the Written Opinion of the International Searching Authority for International Application No. PCT/JP2023/015964, dated Nov. 7, 2024.

(Continued)

*Primary Examiner* — Long T Tran
*Assistant Examiner* — Charles J Brauch
(74) *Attorney, Agent, or Firm* — Birch, Stewart, Kolasch & Birch, LLP

(57)            ABSTRACT

A control device (10) for a vehicle (1) including detecting means (21-24) that detect a vehicle body speed (V), a yaw rate (r), a lateral acceleration ($A_y$), and a longitudinal acceleration ($A_x$) of the vehicle (1), includes: a first estimator (11) that estimates, among coefficients included in a transfer function of a product of the vehicle body speed (V) and the yaw rate (r) using the lateral acceleration ($A_y$) as an input, a particular coefficient including cornering power ($K_r$) of a rear wheel (2R) of the vehicle (1); a second estimator (12) that estimates a grip degree ($k_{rg}$) of the rear wheel (2R) indicating slipperiness of the rear wheel (2R) based on at least the particular coefficient and the longitudinal acceleration ($A_x$); and a controller (13) that controls, based on the grip degree ($k_{rg}$) of the rear wheel (2R), an actuator (3-8) or a notifying device (9) of the vehicle (1).

9 Claims, 3 Drawing Sheets

(51) Int. Cl.

| | |
|---|---|
| *B60W 10/18* | (2012.01) |
| *B60W 10/20* | (2006.01) |
| *B60W 10/22* | (2006.01) |
| *B60W 30/02* | (2012.01) |
| *B60W 50/00* | (2006.01) |
| *B60W 50/14* | (2020.01) |

(52) U.S. Cl.

CPC ............ *B60W 10/20* (2013.01); *B60W 10/22* (2013.01); *B60W 30/02* (2013.01); *B60W 50/14* (2013.01); *B60W 2050/0042* (2013.01); *B60W 2520/10* (2013.01); *B60W 2520/105* (2013.01); *B60W 2520/125* (2013.01); *B60W 2520/14* (2013.01); *B60W 2710/18* (2013.01); *B60W 2710/202* (2013.01); *B60W 2710/22* (2013.01)

(58) Field of Classification Search

CPC ......... B60W 50/14; B60W 2050/0042; B60W 2520/10; B60W 2520/105; B60W 2520/125; B60W 2520/14; B60W 2710/18; B60W 2710/202; B60W 2710/22; B60W 2040/1307; B60W 2050/0025

See application file for complete search history.

(56) References Cited

OTHER PUBLICATIONS

International Search Report (PCT/ISA/210) issued in PCT/JP2023/015964, dated Jul. 18, 2023.

* cited by examiner

CONTROL DEVICE FOR VEHICLE

TECHNICAL FIELD

The present invention relates to a control device for a vehicle which device estimates the slipperiness of a rear wheel of the vehicle and controls an actuator of the vehicle in accordance with the result of the estimation.

BACKGROUND TECHNIQUE

Conventionally, suppression of spinning behavior of a vehicle has been carried out as one of vehicle motion controls. The spinning behavior is behavior that the vehicle body substantially turns inward due to lowering of the cornering force of the rear wheel for some reason when the vehicle is turning. Techniques for estimating the occurrence of such spinning behavior have been known. For example, Patent Document 1 determines lateral slip of the rear wheel by calculating frequency transfer characteristic based on a lateral acceleration (lateral G) acting on the vehicle, the rotational angular velocity (hereinafter referred to as "yaw rate") around the center of gravity of the vehicle, and a vehicle body speed and further calculating the cornering power of the rear wheel of the vehicle on the basis of the frequency transfer characteristic. Since the value of cornering power of the rear wheel is greatly reduced when lateral slip of the rear wheel occurs, the presence or absence of lateral slip can be determined from the calculated value of the cornering power of the rear wheel.

PRIOR ART DOCUMENT

Patent Document

[Patent Document 1] Japanese Laid-open Patent Publication No. 2010-202046

SUMMARY OF INVENTION

Problems to be Solved by Invention

As described in the above-mentioned Patent Document 1, lateral slip can be determined by calculating the cornering power of the rear wheel, but the process to calculating the cornering power of the rear wheel may include uncertainty (e.g., estimation error or calculation error). In determining the presence or absence of lateral slip and the suppression control of the spinning behavior of a vehicle, it is essential to enhance the estimation precision by suppressing the error of the values (the value corresponding to cornering power of the rear wheel in Patent Document 1) used for the determination and the control as much as possible.

With the foregoing problems in view, one of the objects of the present disclosure is to enhance the controllability of the vehicle by precisely estimating values representing lowering of the cornering force of the rear wheel, that is, the slipperiness of the rear wheel. In addition to the above object, an advantageous effect that is derived from each configuration shown in the following embodiment to carry out the invention and that is not obtained by the conventional technique can be regarded as another object of the present disclosure.

Means to Solve Problems of Invention

The disclosed control device for a vehicle can be implemented in the embodiment and application disclosed below, and solves at least a part of the above-described problems.

The disclosed control device for a vehicle is applied to a vehicle that includes vehicle body speed detecting means that detects a vehicle body speed of the vehicle, yaw rate detecting means that detects a yaw rate of the vehicle, lateral acceleration detecting means that detects a lateral acceleration of the vehicle, and longitudinal acceleration detecting means that detects a longitudinal acceleration of the vehicle. The control device includes: a first estimator that estimates, among coefficients included in a transfer function of a product of the vehicle body speed and the yaw rate using the lateral acceleration as an input, a particular coefficient including cornering power of a rear wheel of the vehicle; a second estimator that estimates a grip degree of the rear wheel indicating slipperiness of the rear wheel based on at least the particular coefficient and the longitudinal acceleration; and a controller that controls, based on the grip degree of the rear wheel, an actuator or a notifying device of the vehicle.

Effect of Invention

Since estimating the grip degree of a rear wheel indicating the slipperiness of the rear wheel based on the particular coefficient and the longitudinal acceleration included in the transfer function, the disclosed control device for a vehicle can enhance the estimation precision by reducing the uncertainty due to less computation process as compared with the conventional method for calculating the cornering power of a rear wheel from the transfer function. In addition, since an actuator or a notifying device of the vehicle is controlled in accordance with the estimated grip degree of the rear wheel, the controllability of the vehicle can be enhanced.

BRIEF DESCRIPTION OF DRAWINGS

FIG. 2 is a diagram showing a linear bicycle model of the vehicle;

FIG. 3 is a block diagram illustrating a process that the control device of FIG. 1 carries out.

EMBODIMENT TO CARRY OUT INVENTION

Description will now be made in relation to a control device for a vehicle according to an embodiment with reference to the accompanying drawings. The following embodiment is merely illustrative and is not intended to exclude the application of various modifications and techniques not explicitly described in the embodiment. The configuration of each embodiment can be variously modified without departing from the scope thereof. Also, the configuration can be selected or omitted or appropriately combined according to the requirement. In the following explanation, a direction in which a vehicle moves forward is referred to as front (vehicle front), and the left and right directions are defined on the basis of the front.

Figure 1:
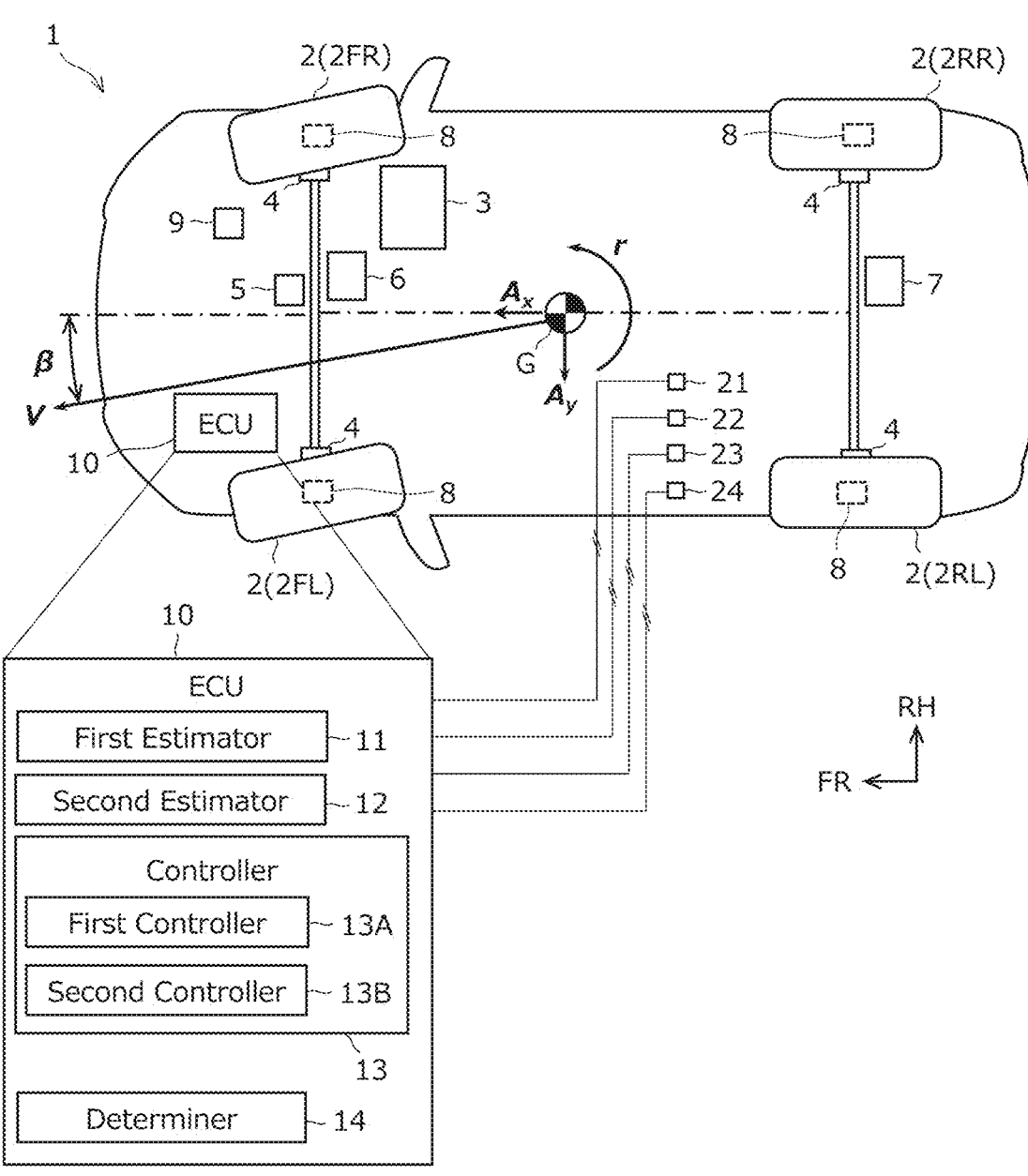
FIG. 1 is a diagram illustrating the configuration of a vehicle that adopts a control device according to an embodiment.

1. Device Configuration:

A control device 10 of the present embodiment is applied to a vehicle 1 illustrated in FIG. 1, and has a function to determine an index (a grip degree of a rear wheel to be described below) indicating the slipperiness of at least a rear wheel 2R of the vehicle 1. The control device 10 is one of Electronic Control Units (ECUs) mounted on the vehicle 1, and is expressed as "ECU" in FIG. 1. The control device 10 includes, for example, a processor (microprocessor) such as a CPU (Central Processing Unit) and an MPU (Micro Processing Unit), a ROM (Read Only Memory), a RAM (Random Access Memory), and a non-volatile memory.

The processor is an arithmetic processor including a control unit (controlling circuit), an arithmetic unit (arithmetic circuit), and a cache memory (register group). The ROM, the RAM and the non-volatile memory are memory devices in which program and data in operation are stored. The contents of the determination and control performed by the control device 10 are recorded and stored as firmware or an application program in the memory, and when the program is to be executed, the contents of the program are expanded in a memory space and executed by the processor.

Examples of the vehicle 1 are an engine vehicle, an Electric Vehicle (EV), and a Fuel Cell Vehicle (FCV), each provided with a driving source 3 such as an engine and/or an electric motor. Examples of an EV are a Hybrid Electric Vehicle (HEV) and a Plug-in Hybrid Electric Vehicle (PHEV). Brake devices 4 are provided one to each of left and right front wheels 2FL, 2FR and the left and right rear wheels 2RL, 2RR of the vehicle 1, and the four wheels are subjected to brake control independently of each other. Further, the vehicle 1 is provided with a power steering device 5 that assists a steering operation of a driver, an AFS (Active Front Steering) 6 that can actively control steering amounts (front wheel steering angles) of the front wheels 2F (2FL, 2FR), and an ARS (Active Rear Steering) 7 that can actively control steering amounts (rear wheel steering angles) of the rear wheels 2R (2RL, 2RR). Further, the vehicle 1 of the present embodiment is provided with active suspensions 8 and a notifying device 9 for making a displayed or audio announcement to the driver.

These devices 3 to 9 are individually controlled by one or more non-illustrated on-board control devices. For example, the vehicle 1 is equipped with a control device (e.g., an engine ECU or a motor ECU) that controls the driving source 3, a brake ECU that controls the brake devices 4, an ECU that controls the power steering device 5, an ECU that controls the AFS 6 and the ARS 7, an ECU that controls the active suspensions 8, and an ECU that controls the notifying device 9. In the present embodiment, if the control device 10 controls the devices 3 to 9, the control device 10 sends commands to these ECUs and the ECUs control the corresponding devices 3 to 9. Among the devices 3 to 9, the devices 3 to 8, which exert a function to convert energy into mechanical displacements and stresses, can be each referred to as an "actuator". Alternatively, a common ECU may have a function of controlling the multiple devices 3 to 9.

The vehicle 1 is provided with sensors that obtain various types of data of the vehicle 1. In the example shown in FIG. 1, a vehicle speed sensor 21, a yaw rate sensor 22, a lateral acceleration sensor 23, and a longitudinal acceleration sensor 24 are provided, and the sensors 21 to 24 are each connected to the control device 10. The vehicle speed sensor 21 (vehicle body speed detecting means) is a sensor that detects the vehicle body speed V of the vehicle 1, and the yaw rate sensor 22 (yaw rate detecting means) is a sensor that detects, as a yaw rate r, the rotational angular velocity around the vertical axis passing through center G of gravity of the vehicle 1. In the present embodiment, as indicated by thick arrows in FIG. 1, the positive direction of the vehicle body speed V is the direction from the center G of gravity toward the front, and the positive direction of the yaw rate r is a counterclockwise direction around the center G of gravity when the vehicle 1 is viewed from above.

The lateral acceleration sensor 23 (lateral acceleration detecting means) and longitudinal acceleration sensor 24 (longitudinal acceleration detecting means) are sensors that detect lateral acceleration $A_y$ and longitudinal acceleration $A_x$ at the center G of gravity of the vehicle 1, respectively. In the present embodiment, as indicated by thick arrows in FIG. 1, the positive direction of the lateral acceleration $A_y$ is a leftward direction from the center G of gravity, and the positive direction of the longitudinal acceleration $A_x$ is a direction from the center G of gravity toward the front. The data detected by the sensors 21 to 24 are sent to the control device 10.

The means to detect the vehicle body speed V is not limited to the vehicle speed sensor 21, and alternatively, a wheel velocity sensor that detects the angular velocity of each wheel 2 may be provided and the vehicle body speed V may be calculated from the value detected by the wheel velocity sensor. Similarly, the means to detect the yaw rate r, the means to detect the lateral acceleration $A_y$, and the means to detect the longitudinal acceleration $A_x$ are not limited to the yaw rate sensor 22, the lateral acceleration sensor 23, and the longitudinal acceleration sensor 24, respectively. For example, the lateral acceleration $A_y$ may be detected by estimating the lateral acceleration $A_y$ based on the steering angle or the vehicle body speed V, or by correcting the estimated value or the value detected by the lateral acceleration sensor 23 with another sensor value. Similarly, the yaw rate r and the longitudinal acceleration $A_x$ may be detected by correcting the value detected by the yaw rate sensor 22 and the value detected by the longitudinal acceleration sensor 24, respectively, with other sensor values. In such cases, an estimator and a corrector (the functional elements of the control device) can serve as the respective detecting means.

2. Control Configuration:

The control device 10 of the present embodiment estimates a "grip degree $k_{rg}$ of the rear wheel", which is an index indicating the slipperiness of the rear wheel 2R of the vehicle 1, using the data detected by the various sensors 21 to 24, and controls the actuator or the notifying device 9 in accordance with the estimated "grip degree $k_{rg}$ of the rear wheel". The control device 10 may also have a function of determining a road surface condition while vehicle 1 is running on the basis of the grip degree kig of the rear wheel. The road surface condition to be determined here includes, for example, dry paving roads, wet roads, snow-covered roads, frozen road surfaces, gravel (unpaved roads), and muddy roads.

The grip degree $k_{rg}$ of the rear wheel is a value representing the magnitude of the slipperiness (frictional force, cornering power of the rear wheel) of the rear wheel 2R of the vehicle 1, and is smaller as the rear wheel 2R is more slippery but is larger as the rear wheel 2R is less slippery. That is, the grip degree $k_{rg}$ of the rear wheel and the slipperiness of the rear wheel 2R are negatively correlated. Since the control device 10 of the present embodiment has the function to determine the road surface condition, the control device 10 stores a correlation between the grip degree $k_{rg}$ of the rear wheel and the road surface condition in advance.

The control device 10 includes a first estimator 11, a second estimator 12, and a controller 13 as functional elements that estimate the grip degree $k_{rg}$ of the rear wheel and control the actuator or the notifying device 9 of the vehicle 1. Further, the control device 10 of the present embodiment includes a determiner 14 as a functional element that determines the road surface condition from the estimated grip degree $k_{rg}$ of the rear wheel. These elements are classification of the functions of the control device 10 for the sake of convenience. These elements may be each described as an independent program and may also be described as a combined program of multiple elements. The program corresponding to each element is stored in the memory or the storage device of the control device 10 and executed by the processor.

The first estimator 11 estimates, among coefficients included in a transfer function G(s) of a product of the vehicle body speed V and the yaw rate r using the lateral acceleration $A_y$ as an input, a particular coefficient including cornering power $K_r$ of the rear wheel of the vehicle 1. Here, the transfer function G(s) is expressed by following Equation 1. In Equation 1, $a_1$, $b_1$, and $b_2$ are coefficients. In this way, the transfer function G(s) is an expression in which the numerator is linear and the denominator is quadratic and which has a constant gain of 1.

[Math. 1]

$$G(s) = \frac{V \cdot r(s)}{A_y(s)} = \frac{1 + a_1 s}{1 + b_1 s + b_2 s^2} \qquad \text{(Equation 1)}$$

Figures 2, 3:
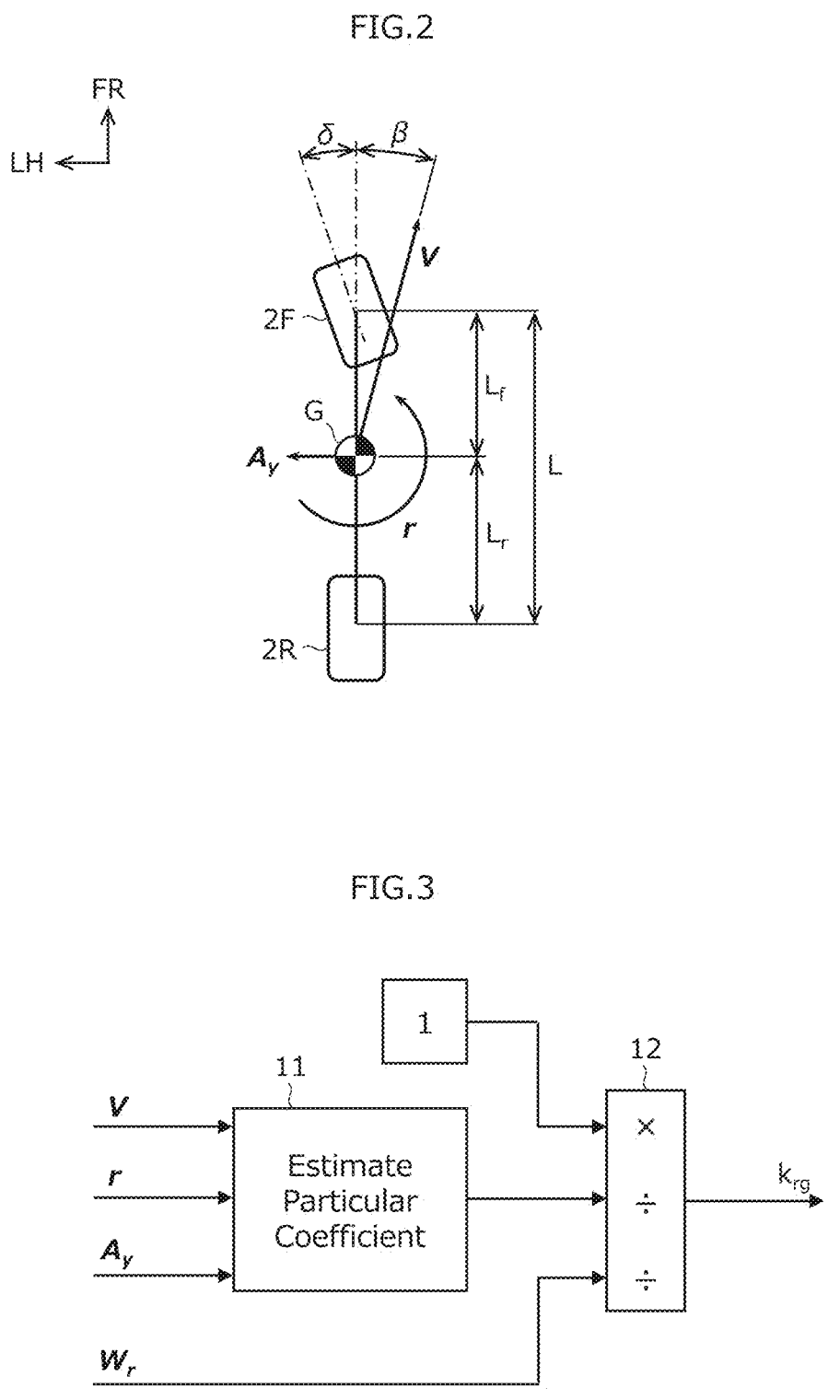

Here, as shown in FIG. 2, the vehicle 1 is modeled into a linear bicycle model. A linear bicycle model is a mathematical model of the vehicle 1 in which the vehicle 1 is regarded as one rigid body and is linearized by reducing the degree of freedom in motion. This model regards the vehicle 1 as a rigid body provided with a single front wheel 2F and a single rear wheel 2R, and considers only plane motion in the lateral direction and yaw direction under the assumption that the vehicle speed is constant. The description here also assumes that the cornering force generated at the wheels 2 is proportional to the lateral slip angle.

The motion equation of this bicycle model is expressed by Equation 2 below. In this equation, the symbol m is a vehicle weight, the symbol $\beta$ is a slip angle of the center of gravity, the symbol I is a yaw moment of inertia, the symbol $K_r$ is cornering power of the front wheel, the symbol $\beta_f$ is a slip angle of the front wheel (lateral slip angle of the front wheel 2F), the symbol $\beta_r$ is a slip angle of the rear wheel (lateral slip angle of the rear wheel 2R), the symbol $L_r$ is a longitudinal distance between the front axle and the center G of gravity, and the symbol $L_r$ is a longitudinal distance between the rear axle and the center G of gravity.

[Math. 2]

$$\begin{cases} mV(\dot{\beta} + r) = 2K_f \beta_f + 2K_r \beta_r \\ I\dot{r} = 2K_f \beta_f L_f - 2K_r \beta_r L_r \end{cases} \qquad \text{(Equation 2)}$$

The slip angles $\beta_f$ and $\beta_r$ of the front wheel 2F and the rear wheel 2R, respectively, are expressed by Equation 3 below. In this equation, the symbol $\delta$ is a steering angle of the vehicle 1.

[Math. 3]

$$\beta_f = \delta - (\beta + \frac{L_f}{V} r) \qquad \text{(Equation 3)}$$

$$\beta_r = -\beta + \frac{L_r}{V} r$$

In the above Equation 3, assuming that the vehicle body speed V is constant, above Equation 2 comes to be linear with respect to the slip angle $\beta$ of the center of gravity and the yaw rate r. Based on this assumption, being subjected to Laplace transform and then rearranged, Equation 2 comes to be the following Equation 4. In this equation, the symbol L is a wheel base (distance between the front and rear axles).

[Math. 4]

$$G(s) = \frac{V \cdot r(s)}{A_y(s)} = \frac{1 + \frac{mL_f}{2K_r L} s}{1 + \frac{L_r}{V} s + \frac{I}{2K_r L} s^2} = \frac{1 + a_1 s}{1 + b_1 s + b_2 s^2} \qquad \text{(Equation 4)}$$

As is apparent from above Equation 4, the coefficients $a_1$ and $b_2$, among the coefficients $a_1$, $b_1$, and $b_2$, each include the cornering power $K_r$ of the rear wheel. The symbols m, $L_r$, I, and L included in these coefficients $a_1$ and $b_2$ represent specification values of the vehicle 1, which have been determined in advance. Therefore, changes in the coefficients $a_1$ and $b_2$ occur due to changes in the cornering power $K_r$ of the rear wheel. Thus, the first estimator 11 uses at least one of coefficients a and $b_2$ as the particular coefficient, and estimates the particular coefficient by using a predetermined estimation method. This makes the first estimator 11 possible to indirectly estimate the change in the cornering power $K_r$ of the rear wheel.

The first estimator 11 of the present embodiment estimates, as the particular coefficient, the coefficient $b_2$ of the denominator quadratic. Examples of the predetermined estimation method include an estimation method using a Kalman filter and a Recursive Least Squares. In estimating state quantities in these estimation methods, a state quantity estimation value (particular coefficient $b_2$) at the present time is estimated by the addition of: a state quantity estimation value estimated by applying a state quantity estimation value at one-time step before to a mathematical model stored in an electronic control unit; and a value obtained by multiplying the deviation between the value (output measurement value) detected by the detecting means (sensors 21 to 24) and an output estimation value estimated by applying the state quantity estimation value at the one-time step before to the mathematical model stored in the electronic control unit by a predetermined gain.

The present inventors have found that estimation using the coefficient $b_2$ of the denominator quadratic as the particular coefficient is higher in precision than estimation using the coefficient $a_1$ of the numerator linear expression as the particular coefficient. For the above, the first estimator 11 of the present embodiment estimates the coefficient $b_2$ as the particular coefficient, but may alternatively estimate the coefficient $a_1$ as the particular coefficient, or may estimate the two coefficients $a_1$ and $b_2$ as the particular coefficients and may use the weighted average of the two estimated values of $a_1$ and $b_2$.

The second estimator 12 estimates the grip degree $k_{rg}$ of the rear wheel on the basis of at least the particular coefficient estimated by the first estimator 11 and a longitudinal acceleration $A_x$ detected by the longitudinal acceleration sensor 24. The second estimator 12 of the present embodiment obtains the grip degree $k_{rg}$ of the rear wheel as the inverse of the product of the particular coefficient $b_2$ estimated by the first estimator 11 and a load $W_r$ on the rear axle obtained from longitudinal acceleration $A_x$ as shown in FIG. 3 and the following Equations 5 and 6.

[Math. 5]

$$k_{rg} = \frac{1}{b_2 W_r} \qquad \text{(Equation 5)}$$

$$W_r = W_{r0} + \Delta W_x \qquad \text{(Equation 6)}$$

$$\text{where, } \Delta W_x = \frac{mh_{cg}}{L} A_x$$

As shown in Equation 6, a load $W_r$ on the rear axle is a value obtained by adding a load displacement amount $\Delta W_x$ between the front and rear axles to a stationary load $W_{r0}$ (fixed value) on the rear axle in a stationary state of the vehicle 1. The longitudinal acceleration $A_x$ is used in the calculation of the load displacement amount $\Delta W_x$ between the front and rear axles. Here, the symbol hog represents the height (fixed value) of the center of gravity.

That is, the second estimator 12 of the present embodiment calculates the load $W_r$ on the rear axle from the detected longitudinal acceleration $A_x$ and the vehicle specification values, and estimates (calculates) the grip degree $k_{rg}$ of the rear wheel from the particular coefficient $b_2$ estimated by the first estimator 11 and the obtained load $W_r$ on the rear axle. The second estimator 12 sends the estimated grip degree $k_{rg}$ of the rear wheel to the controller 13.

The controller 13 controls the actuator or the notifying device 9 of the vehicle 1 in accordance with the grip degree $k_{rg}$ of the rear wheel estimated by the second estimator 12. The actuator to be controlled here is at least one or all of the driving source 3, the brake devices 4, the power steering device 5, the AFS 6, the ARS 7, and the active suspensions 8 described above. When the grip degree $k_{rg}$ of the rear wheel is small (i.e., the rear wheel 2R is more slippery), the spinning behavior of the vehicle 1 is occurring (or is more likely to occur), so that the controller 13 controls the actuator so as to stabilize the behavior of the vehicle 1. The controller 13 may compare the grip degree $k_{rg}$ of the rear wheel with a predetermined first threshold and, when the grip degree $k_{rg}$ of the rear wheel is below the first threshold, may control the actuator so as to stabilize the behavior of the vehicle 1.

Conversely, when the grip degree $k_{rg}$ of the rear wheel is large (which means that the vehicle is in a normal running condition in which no lateral slippage of the rear wheel 2R is occurring), the controller 13 controls the actuator in accordance with the requested torque required for the vehicle 1, the pedaling by the driver, and the vehicle body speed V, for example. The control at this time is called normal control. The normal control may be performed by the control device 10 or by another on-board control device. The controller 13 can determine whether to perform the normal control by, for example, determining whether the grip degree $k_{rg}$ of the rear wheel exceeds a predetermined second threshold. The illustrated example assumes that the another on-board control device performs the normal control. Here, the second threshold is larger than the first threshold.

The controller 13 of the present embodiment includes a first controller 13A that adjusts a control amount of at least one of driving force and braking force of the vehicle 1 in accordance with the grip degree $k_{rg}$ of the rear wheel. When adjusting the control amount of the driving force, the first controller 13A sends a command to a control device of the driving source 3 to control the output (driving force) of the driving source 3. If the vehicle 1 includes a power transmission device, the first controller 13A may control the driving force by controlling the power transmission device.

When adjusting the control amount of the braking force, the first controller 13A sends a command to a control device of the brake devices 4 to control the output (braking force) of the brake devices 4. In controlling the brake devices 4, the wheels 2 can be individually controlled, so that more detailed adjustments can be made. It is also possible to adjust the control amount of the braking force by controlling the driving source 3.

If the normal control is performed, the first controller 13A of the present embodiment adjusts the control amount so as not to hinder the execution of the normal control.

On the other hand, if the normal control is not performed, the first controller 13A adjusts the control amount in accordance with the grip degree $k_{rg}$ of the rear wheel so as to restrict the torque displacement to the front, rear, left, and right as the rear wheel 2R is more slippery. In other words, the first controller 13A adjusts the control amount of at least one of the driving force and the braking force such that the torque displacement is restricted as compared with the driving force and the braking force in the normal control. In this adjustment, the first controller 13A may switch a control map, or may increase or suppress a control output calculated in the normal control.

The controller 13 of the present embodiment includes a second controller 13B that adjusts a control amount of at least one of the steering assist torque of the vehicle 1, the steering amounts of the respective wheels 2, and the active suspensions 8 based on the grip degree $k_{rg}$ of the rear wheel. In controlling the steering assist torque, the second controller 13B sends a command to a control device of the power steering device 5 and controls the output (steering assist torque) of the power steering device 5. In controlling the steering amounts, the second controller 13B sends a command to a control device of the AFS 6 and the ARS 7 to control the outputs (font wheel steering angle, rear wheel steering angle) of the AFS 6 and the ARS 7. In controlling the active suspensions 8, the second controller 13B sends a command to a control device of the active suspensions 8 to control an energy source such as hydraulic pressure, pneumatic pressure, and an electric motor, for example.

Similar to the driving force and the braking force, the steering assist torque of the vehicle 1, the steering amounts of the respective wheels 2, and the active suspensions 8 are controlled in accordance with the steering operation by the driver, the vehicle body speed V, and the like during the normal running in which no lateral slippage of the rear wheel 2R is occurring (i.e., during normal control). If the normal control is performed, the second controller 13B of the present embodiment does not hinder the execution of the normal control.

On the other hand, if the normal control is not performed, the second controller 13B adjusts the control amount of at least one of the steering assist torque, the steering amounts, and the active suspensions 8 in accordance with the grip degree $k_{rg}$ of the rear wheel so that the operability is ensured while the lateral slippage of the rear wheel 2R is suppressed as the rear wheel 2R is more slippery. In this adjustment, the second controller 13B may switch the control map, or may increase or suppress the control output calculated in the normal control.

The control by the first controller 13A and the control by the second controller 13B may be arbitrary combined. For example, the control may have a configuration in which the driving force and the braking force are controlled by first controller 13A, and the steering assist torque, the steering amounts, and the active suspensions 8 are all controlled by the second controller 13B, or a configuration in which only the braking force is controlled by the first controller 13A and only the steering assist torque is controlled by the second controller 13B. Alternatively, the control may have a configuration in which both the driving force and the braking force are controlled by the first controller 13A, and nothing is controlled by the second controller 13B. In this way, by using two or more controls in combination, the flexibility of the control is increased to achieve more precise vehicle motion control.

Note that, when the grip degree $k_{rg}$ of the rear wheel estimated by the second estimator 12 is smaller than a predetermined third threshold, the controller 13 may control the notifying device 9 to announce the lateral slip state of the vehicle 1 to the driver. The third threshold is a value smaller than the second threshold, and may be the same as or different from the first threshold.

The determiner 14 determines the road surface condition on which the vehicle 1 is running on the basis of the grip degree $k_{rg}$ of the rear wheel estimated by the second estimator 12. This determination can use, for example, a correlation between the grip degree $k_{rg}$ of the rear wheel and the road surface condition stored in advance. As one example, the determiner 14 determines that the road surface is a dry paved road when the grip degree $k_{rg}$ of the rear wheel is equal to or greater than a first predetermined value, and determines that the road surface is a wet road when the grip degree $k_{rg}$ of the rear wheel is less than the first predetermined value and is equal to or greater than a second predetermined value that is smaller than the first predetermined value. In addition, the determiner 14 determines that the road surface is a snow-covered road when the grip degree $k_{rg}$ of the rear wheel is less than the second predetermined value and is equal to or greater than a third predetermined value that is smaller than the second predetermined value. Further, the determiner 14 determines that the road surface is a frozen road surface when the grip degree $k_{rg}$ of the rear wheel is less than the third predetermined value. Other road surface conditions (e.g., unpaved road or muddy road) may be determined in the same manner.

Furthermore, the controller 13 may control, in place of or in addition to the control of the actuator, the notifying device 9 in accordance with the grip degree $k_{rg}$ of the rear wheel estimated by the second estimator 12. For example, the controller 13 may announce the result of determining the road surface condition by the determiner 14 to the driver via audio or display.

Figure 4:
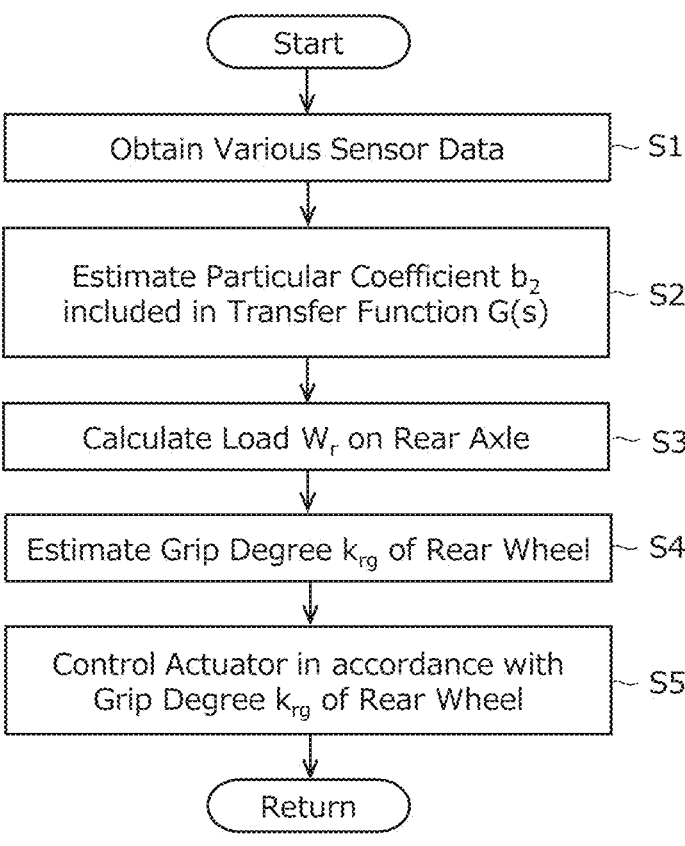
FIG. 4 is a diagram illustrating an example of a flowchart that the control device of FIG. 1 carries out.

3. Flow Chart:

FIG. 4 illustrates an example of a flow chart performed by the control device 10 described above. This flow chart is executed, for example, at a predetermined calculation cycle when the main power supply of the vehicle 1 is in the "on" state. First, the data of the various sensors 21 to 24 are obtained in Step S1. In Step S2, the first estimator 11 estimates the particular coefficient $b_2$ included in the transfer function G(s) of the above Equation 1. Then, the second estimator 12 calculates the load $W_r$ on the rear axle (Step S3) and estimates (calculates) the grip degree $k_{rg}$ of the rear wheel (Step S4). In Step S5, the controller 13 (first controller 13A, second controller 13B) controls the actuator or the notifying device 9 in accordance with the grip degree $k_{rg}$ of the rear wheel, and returns this flow chart.

4. Actions and Effects:

The grip degree $k_{rg}$ of the rear wheel based on the particular coefficients $a_1$ and $b_2$ each including the cornering power $K_r$ of the rear wheel is a parameter that indicates the slipperiness of the rear wheel 2R and that can express the frictional condition between the rear wheel 2R and the road surface. Focusing on a point that a change in the cornering power $K_r$ of the rear wheel can be grasped from changes in the particular coefficients $a_1$ and $b_2$ included in the transfer function G(s), the above control device 10 estimates the particular coefficients $a_1$ and $b_2$ from three detected values (i.e., the lateral acceleration $A_y$, the yaw rate r, the vehicle body speed V). In addition, the control device 10 estimates the grip degree $k_{rg}$ of the rear wheel based on the particular coefficients $a_1$ and $b_2$ and the longitudinal acceleration $A_x$. As described above, the present control device 10 can enhance the estimation precision by reducing the uncertainty due to less computation process as compared with the conventional method for calculating the cornering power $K_r$ of a rear wheel from the transfer function G(s). In addition, since the data of the longitudinal acceleration $A_x$ is also taken into consideration, it is possible to estimate the grip degree $k_{rg}$ of the rear wheel according to the driving condition, and from this point as well, the estimation precision can be enhanced.

In addition, since the above control device 10 controls the actuator or the notifying device 9 of the vehicle 1 in accordance with the grip degree $k_{rg}$ of the rear wheel based on the particular coefficients $a_1$ and $b_2$ and the longitudinal acceleration $A_x$, it is possible to enhance the controllability of the vehicle 1. As a result, for example, it is possible to contribute to enhancement in the suppression control of the spinning behavior, which is one of the vehicle motion controls.

The above control device 10 adjusts the control amount of at least one of the driving force and the braking force of the vehicle 1 in accordance with the grip degree $k_{rg}$ of the rear wheel. For the above, since it is possible to adjust, specifically, increase or decrease the control amount of at least one of the driving force and the braking force in accordance with the slipperiness (the magnitude of the frictional force) of the rear wheel 2R (for example, it is possible to suppress the torque displacement to the front, rear, left, and right when the rear wheel 2R is slippery), it is possible to further contribute to the enhancement in the suppression control of the spinning behavior and to achieve the intended behavior, for example.

The above control device 10 adjusts the control amount of at least one of the steering assist torque of the vehicle 1, the steering amounts of the respective wheels 2, and the active suspensions 8 based on the grip degree $k_{rg}$ of the rear wheel. For the above, it is possible to ensure operability by adjusting, specifically, increasing or decreasing the control amounts of the steering assist torque and the steering amounts in accordance with the slipperiness of the rear wheel 2R (magnitude of the friction force). In addition, the grounding states of the wheels 2 can be controlled by adjusting the control amount (hydraulic pressure and pneumatic pressure) of the active suspensions 8. Thereby, it is possible to further contribute to the enhancement in the suppression control of the spinning behavior and to achieve the intended behavior, for example, it is possible.

The above control device 10 estimates the grip degree $k_{rg}$ of the rear wheel using the above Equations 5 and 6, which makes it possible to estimate the grip degree $k_{rg}$ of the rear wheel according to the running condition by simple computation.

Further, the above control device 10 uses, as the particular coefficient, the coefficient $b_2$ of the denominator quadratic of the above Equations 1 and 4. This is because the inventors have found that estimation using the coefficient $b_2$ derives a closer value to the real state in using, for example, a Kalman filter. Therefore, by using this coefficient $b_2$ as the particular coefficient, the precision in estimating the grip degree $k_{rg}$ of the rear wheel can be further enhanced.

5. Miscellaneous:

The configuration of the control device 10 described above is an example, and is not limited to the configuration described above. For example, the above control device 10 is provided with two functions of the first controller 13A and the second controller 13B in the controller 13, but these functions may be undivided. The six control targets (driving force, braking force, steering assist torque, steering amounts, active suspensions 8, and notifying device 9) described above may be controlled independently, together, or in combination.

In the control device 10 described above, the determiner 14 determines the road surface condition, but this determination may be omitted. The method for calculating the load $W_r$ on the rear axle is not limited to the above-described method.

The above embodiment estimates, as the particular coefficient, a coefficient $b_2$ of the denominator quadratic, but may alternatively estimate the coefficient $a_1$ of the numerator linear expression as the particular coefficient. The method for estimating the grip degree $k_{rg}$ of the rear wheel is not limited to the above-described method, and may be sufficient as far as the method is based on at least the particular coefficient and the longitudinal acceleration $A_x$.

The configuration of the vehicle 1 adopting the control device 10 is merely an example, and is not limited to the above described vehicle. For example, if the vehicle 1 is provided with an Active Stability Control (ASC) device, the ASC device may be activated in accordance with the grip degree $k_{rg}$ of the rear wheel estimated by the control device 10. In addition, the AFS 6 and the ARS 7 may be omitted from the vehicle 1, or the driving source 3 (for example, an in-wheel motor) may be provided for each wheel 2.

DESCRIPTION OF REFERENCE SIGNS

1: vehicle
2: wheel
2FL: front left wheel (front wheel, wheel)
2FR: front right wheel (front wheel, wheel)
2RL: rear left wheel (rear wheel, wheel)
2RR: rear right wheel (rear wheel, wheel)
3: driving source (actuator)
4: brake device (actuator)
5: power steering device (actuator)
6: AFS (actuator)
7: ARS (actuator)
8: active suspension (actuator)
9: notifying device
10: control device
11: first estimator
12: second estimator
13: controller
13A: first controller
13B: second controller
14: determiner
21: vehicle speed sensor (vehicle body speed detecting means)
22: yaw rate sensor (yaw rate detecting means)
23: lateral acceleration sensor (lateral acceleration detecting means)
24: longitudinal acceleration sensor (longitudinal acceleration detecting means)
$A_x$: longitudinal acceleration
$A_y$: lateral acceleration

12

$a_1$: coefficient (particular coefficient)
$b_1$: coefficient
$b_2$: coefficient (particular coefficient)
G: center of gravity
G(s): transfer function
I: yaw moment of inertia
$k_{rg}$: grip degree of rear wheel
$k_r$: cornering power of rear wheel
L: wheel base (distance between front and rear axles)
$L_f$: longitudinal distance between front axle and center of gravity
$L_r$: longitudinal distance between rear axle and center of gravity
m: vehicle weight
r: yaw rate
V: vehicle body speed
$W_r$: load on rear axle
$W_{r0}$: stationary load on rear axle
B: slip angle of center of gravity
$\beta_f$: slip angle of front wheel
$\beta_r$: slip angle of rear wheel
δ: steering angle

The invention claimed is:

1. A control device for a vehicle, the vehicle comprising vehicle body speed detecting means that detects a vehicle body speed of the vehicle, yaw rate detecting means that detects a yaw rate of the vehicle, lateral acceleration detecting means that detects a lateral acceleration of the vehicle, and longitudinal acceleration detecting means that detects a longitudinal acceleration of the vehicle, the control device comprising:

a first estimator that estimates, among coefficients included in a transfer function of a product of the vehicle body speed and the yaw rate using the lateral acceleration as an input, a particular coefficient including cornering power of a rear wheel of the vehicle;

a second estimator that estimates a grip degree of the rear wheel indicating slipperiness of the rear wheel based on at least the particular coefficient and the longitudinal acceleration; and a controller that controls, based on the grip degree of the rear wheel, an actuator or a notifying device of the vehicle.

2. The control device according to claim 1, wherein the controller adjusts, in accordance with the grip degree of the rear wheel, a control amount of at least one of driving force and braking force of the vehicle.

3. The control device according to claim 1, wherein the controller adjusts, based on the grip degree of the rear wheel, a control amount of at least one of steering assist torque of the vehicle, a steering amount of each wheel, and an active suspension.

4. The control device according to claim 1, wherein the second estimator obtains, based on a stationary load on a rear axle in a stationary state of the vehicle and the longitudinal acceleration, a load on the rear axle of the vehicle, and calculates, as the grip degree of the rear wheel, an inverse of a product of the particular coefficient and the load on the rear axle.

5. The control device according to claim 3, wherein the second estimator obtains, based on a stationary load on a rear axle in a stationary state of the vehicle and the longitudinal acceleration, a load on the rear axle of the vehicle, and calculates, as the grip degree of the rear wheel, an inverse of a product of the particular coefficient and the load on the rear axle.

6. The control device according to claim 1, wherein
the first estimator estimates, as the particular coefficient, a coefficient $b_2$ of a denominator quadratic of the transfer function expressed by an Equation 1 below, and
the second estimator estimates the grip degree of the rear wheel by an Equation 2 below,

[Math. 1]

$$G(s) = \frac{V \cdot r(s)}{A_y(s)} = \frac{1 + a_1 s}{1 + b_1 s + b_2 s^2} \qquad \text{(Equation 1)}$$

$$k_{rg} = \frac{1}{b_2 W_r} \qquad \text{(Equation 2)}$$

where, G(s): the transfer function, V: the vehicle body speed, r: the yaw rate, $A_y$: the lateral acceleration, $a_1$, $b_1$, $b_2$: the coefficient, $k_{rg}$: the grip degree of the rear wheel, $W_r$: the load on the rear axle.

7. The control device according to claim 3, wherein
the first estimator estimates, as the particular coefficient, a coefficient $b_2$ of a denominator quadratic of the transfer function expressed by an Equation 1 below, and
the second estimator estimates the grip degree of the rear wheel by an Equation 2 below,

[Math. 2]

$$G(s) = \frac{V \cdot r(s)}{A_y(s)} = \frac{1 + a_1 s}{1 + b_1 s + b_2 s^2} \qquad \text{(Equation 1)}$$

$$k_{rg} = \frac{1}{b_2 W_r} \qquad \text{(Equation 2)}$$

where, G(s): the transfer function, V: the vehicle body speed, r: the yaw rate, $A_y$: the lateral acceleration, $a_1$, $b_1$, $b_2$: the coefficient, $k_{rg}$: the grip degree of the rear wheel, $W_r$: the load on the rear axle.

8. The control device according to claim 4, wherein
the first estimator estimates, as the particular coefficient, a coefficient $b_2$ of a denominator quadratic of the transfer function expressed by an Equation 1 below, and
the second estimator estimates the grip degree of the rear wheel by an Equation 2 below,

[Math. 3]

$$G(s) = \frac{V \cdot r(s)}{A_y(s)} = \frac{1 + a_1 s}{1 + b_1 s + b_2 s^2} \qquad \text{(Equation 1)}$$

$$k_{rg} = \frac{1}{b_2 W_r} \qquad \text{(Equation 2)}$$

where, G(s): the transfer function, V: the vehicle body speed, r: the yaw rate, $A_y$: the lateral acceleration, $a_1$, $b_1$, $b_2$: the coefficient, $k_{rg}$: the grip degree of the rear wheel, $W_r$: the load on the rear axle.

9. The control device according to claim 5, wherein
the first estimator estimates, as the particular coefficient, a coefficient $b_2$ of a denominator quadratic of the transfer function expressed by an Equation 1 below, and
the second estimator estimates the grip degree of the rear wheel by an Equation 2 below,

[Math. 4]

$$G(s) = \frac{V \cdot r(s)}{A_y(s)} = \frac{1 + a_1 s}{1 + b_1 s + b_2 s^2} \qquad \text{(Equation 1)}$$

$$k_{rg} = \frac{1}{b_2 W_r} \qquad \text{(Equation 2)}$$

where, G(s): the transfer function, V: the vehicle body speed, r: the yaw rate, $A_y$: the lateral acceleration, $a_1$, $b_1$, $b_2$: the coefficient, $k_{rg}$: the grip degree of the rear wheel, $W_r$: the load on the rear axle.

* * * * *